United States Patent
Gethmann et al.

(10) Patent No.: US 7,410,144 B2
(45) Date of Patent: Aug. 12, 2008

(54) PIVOT AND BEARING ASSEMBLY FOR A MANUAL VALVE OPERATOR

(75) Inventors: Douglas Paul Gethmann, Gladbrook, IA (US); David George Halm, Haverhill, IA (US)

(73) Assignee: Fisher Controls International LLC, St. Louis, MO (US)

( * ) Notice: Subject to any disclaimer, the term of this patent is extended or adjusted under 35 U.S.C. 154(b) by 124 days.

(21) Appl. No.: 11/144,122

(22) Filed: May 31, 2005

(65) Prior Publication Data

US 2006/0266972 A1    Nov. 30, 2006

(51) Int. Cl.
*F16K 31/52* (2006.01)
*F16K 31/00* (2006.01)

(52) U.S. Cl. .............................. 251/14; 251/266; 74/89

(58) Field of Classification Search .................. 251/14, 251/129.03, 229, 231, 264, 273, 266; 74/89; 137/270
See application file for complete search history.

(56) References Cited

U.S. PATENT DOCUMENTS

| | | | | |
|---|---|---|---|---|
| 1,648,710 | A | | 11/1927 | Wright |
| 2,319,336 | A | * | 5/1943 | McCullough ................ 251/229 |
| 3,198,034 | A | * | 8/1965 | De Witte et al. .............. 74/625 |
| 4,050,670 | A | * | 9/1977 | Borg et al. ..................... 251/14 |
| 4,223,832 | A | * | 9/1980 | Gorchev et al. ............ 236/49.5 |
| 4,239,178 | A | | 12/1980 | Engel et al. |
| 4,815,692 | A | * | 3/1989 | Loiseau et al. ................ 251/14 |
| 5,623,859 | A | * | 4/1997 | Benton ........................ 82/136 |
| 2003/0079779 | A1 | | 5/2003 | Baumann |
| 2004/0020741 | A1 | * | 2/2004 | Kapaan et al. ............. 192/84.6 |

FOREIGN PATENT DOCUMENTS

GB      777464      6/1957

OTHER PUBLICATIONS

International Search Report received in International (PCT) Application PCT/US2006/012790, by the European Patent Office, dated Aug. 3, 2006.
Written Opinion for Application PCT/US2006/012790 by the European Patent Office, dated Aug. 3, 2006.

* cited by examiner

*Primary Examiner*—Stephen M. Hepperle
*Assistant Examiner*—Cloud K Lee
(74) *Attorney, Agent, or Firm*—Marshall, Gerstein & Borun LLP

(57) ABSTRACT

A pivot assembly provides an economical means for reducing the load on a manually operated hand jack by providing a pivot point on the body of a connecting rod which allows for an additional degree of movement. The pivot assembly may include a thrust bearing to further reduce friction on the connection rod.

17 Claims, 6 Drawing Sheets

PIVOT AND BEARING ASSEMBLY FOR A MANUAL VALVE OPERATOR

FIELD OF THE DISCLOSURE

This disclosure relates to hand jacks for manually operating fluid valves.

BACKGROUND OF THE DISCLOSURE

Fluid valves having throttling elements actuated by sliding stems are generally known in the art for regulating fluid flow in process control systems. These fluid valves may include control valves and regulators. The fluid valves are typically coupled to an actuator, which may generate force hydraulically, pneumatically, or electrically. In the case of actuator failure, a manually operated hand jack may be used to move a valve stem assembly so that a throttling element is placed in a safe open or closed position under emergency conditions. Previously known hand jacks may include a bracket, a lever, a pivot pin, and a rod. A handwheel may be attached to the rod to facilitate application of manual torsion force to the rod. Rotation of the rod may pivot the lever about the pin. The lever engages a valve stem, the actuator, or some other component of the valve stem assembly such that rotation of the lever raises or lowers the valve stem, thus opening or closing the valve.

Conventional hand jacks may disadvantageously generate unwanted friction and bending forces during operation. As the lever pivots from an open to close position or close to open position, a point at which the rod is coupled to the lever may follow a generally arcuate path. The bracket usually engages another portion of the rod such that the rod is held in a substantially constant attitude with respect to the valve stem. With one portion of the rod substantially in place and a free end of the rod movable through an arcuate path, operation of the hand jack causes significant bending forces on the rod. The bending forces at the rod/lever coupling thereby increase friction during operation and therefore the force required to operate the hand jack. These stresses on the rod may also magnify the load on coupling mechanisms, e.g., mounting bolts, that secure the hand jack to the valve, and may increase the wear and tear on the device. Moreover, the load on the mounting bolts may increase the risk of structural failure.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
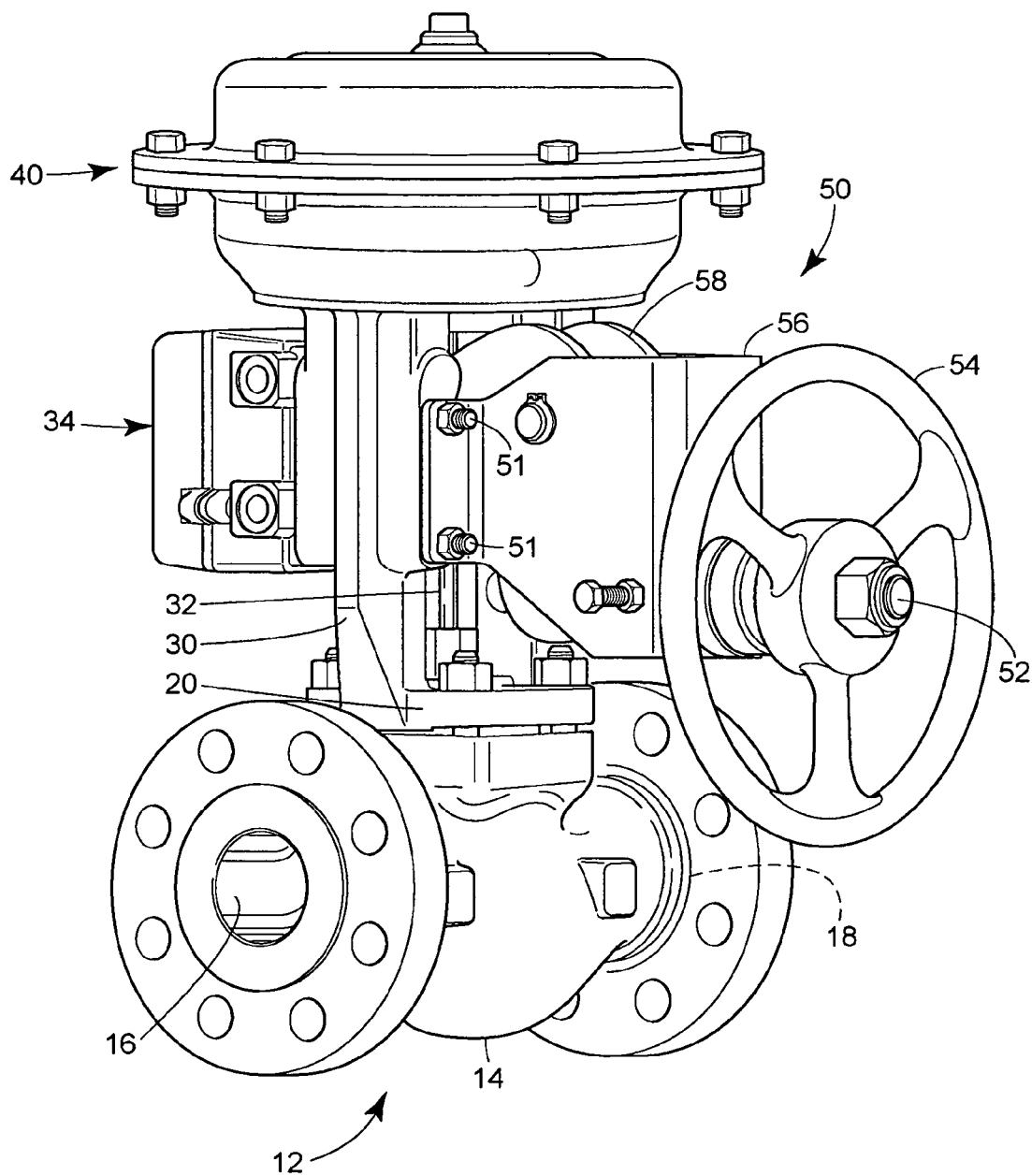
FIG. 1 illustrates a perspective view of a fluid control valve having a side mounted, manually operated hand jack.

FIG. 1 illustrates elements of a control valve assembly 10 that may be used in a process control system, e.g., a processing plant. The control valve assembly includes a valve 12 having a valve body 14, an inlet port 16, an outlet port 18, and a valve bonnet 20. Disposed through the valve bonnet 20 may be a valve stem 32 that may be used to operate the valve 12. A yoke 30 may be attached to or provided with the bonnet 20. While the yoke 30 may be connected to the valve bonnet 20, as illustrated in FIG. 1, the yoke 30 may be mounted to another part of the valve body 14 in other embodiments. The yoke 30 may be used to couple an actuator 40 to the valve body 14. The valve stem 32, which may form a portion of a valve stem assembly, may be adapted to transmit force from the actuator 40 to the valve 12, thereby controlling operation of the valve 12. A positioner 34 may be attached to the yoke 30. The positioner 34 may be used to electrically control the actuator 40. Alternatively, the positioner 34 may be replaced by a fluid feedback control mechanism (not shown in FIG. 1) for use in a regulator valve embodiment. In the illustrated embodiment, a hand jack assembly 50 may be attached to the yoke 30 and coupled to the valve stem assembly. The handjack assembly 50 may generally consist of a rod 52, a handwheel 54, a bracket 56, and a lever assembly 58.

Figure 2:
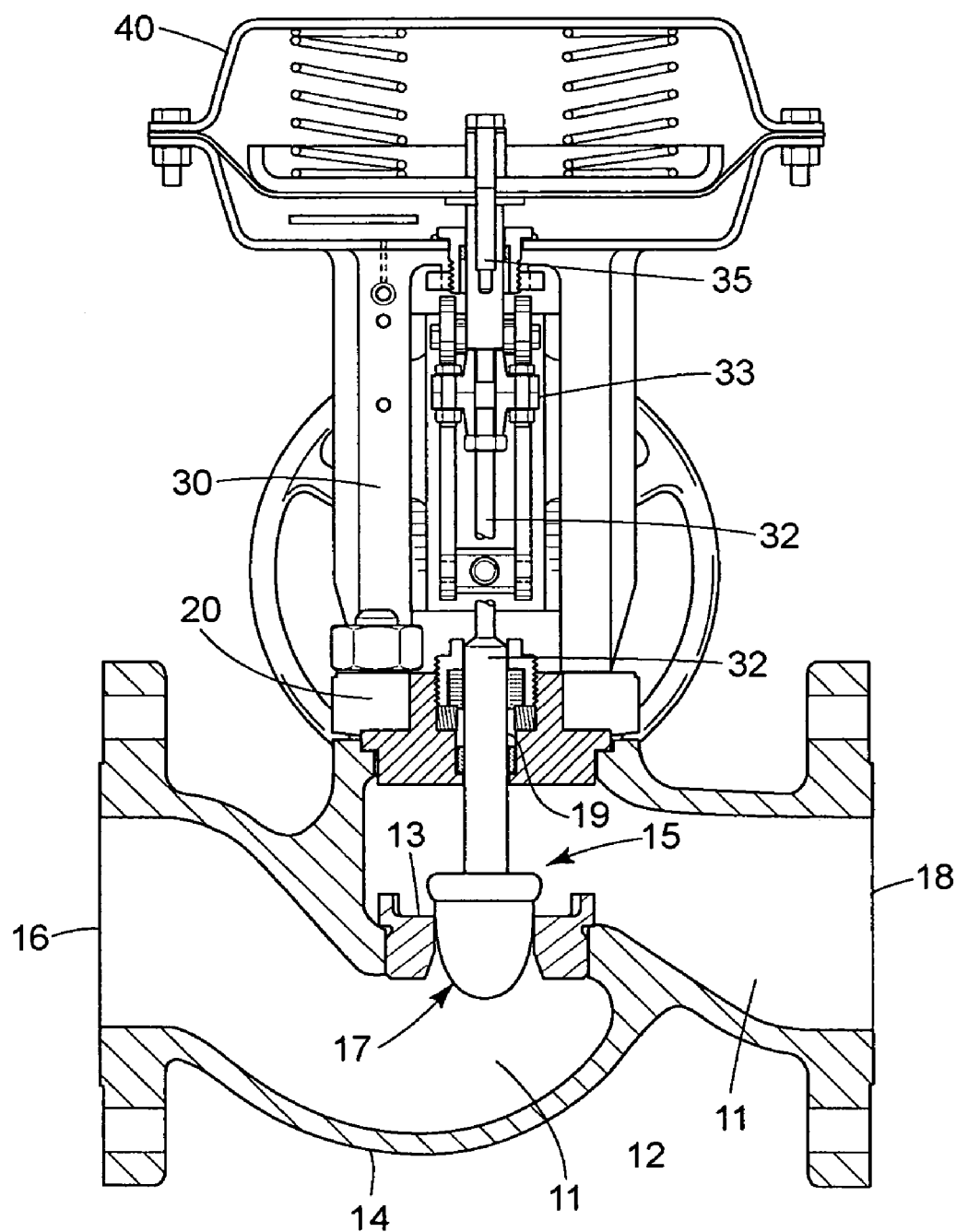
FIG. 2 illustrates a side elevational view, in cross-section, of the fluid control valve of FIG. 1.

FIG. 2 illustrates a cross-sectional view of the control valve assembly 10 of FIG. 1. Note that analogous members are labeled similarly. FIG. 2 illustrates the valve body 14 defining the inlet port 16, the outlet port 18, and a passageway 11 communicating between the inlet port 16 and outlet port 18. A valve seat 13 may be disposed within the valve body 14 through which the passageway 11 passes. A throttle assembly 15 may consist of a throttling element 17 disposed in the passageway and movable relative to the valve seat 13, thereby controlling fluid flow through the valve body 14. The throttle assembly 15 further includes a valve stem 32 coupled to the throttling element 17 and extending through a bore 19 in the valve bonnet 20. When the throttle assembly 15 is lifted to widen a gap between the throttling element 17 and the valve seat 13, flow of fluid through the passageway 11 increases. Lowering the throttle assembly 15 will close the gap and decrease fluid flow until the throttling element 17 completely engages the valve seat 13 (as illustrated in FIG. 2), thereby preventing any further fluid flow through the passageway 11.

The throttle assembly 15 may be coupled to an actuator 40 for raising and lowering the throttle assembly. As illustrated in FIG. 2, the valve stem 32 may be coupled to an actuator rod 35 by a valve stem connector 33. The actuator 40 may be hydraulically, pneumatically, or electrically operated to raise or lower the actuator rod 35 and consequently raise or lower the throttle assembly 15. The actuator 40 may be supported and positioned over the valve body by the yoke 30.

Figure 3:
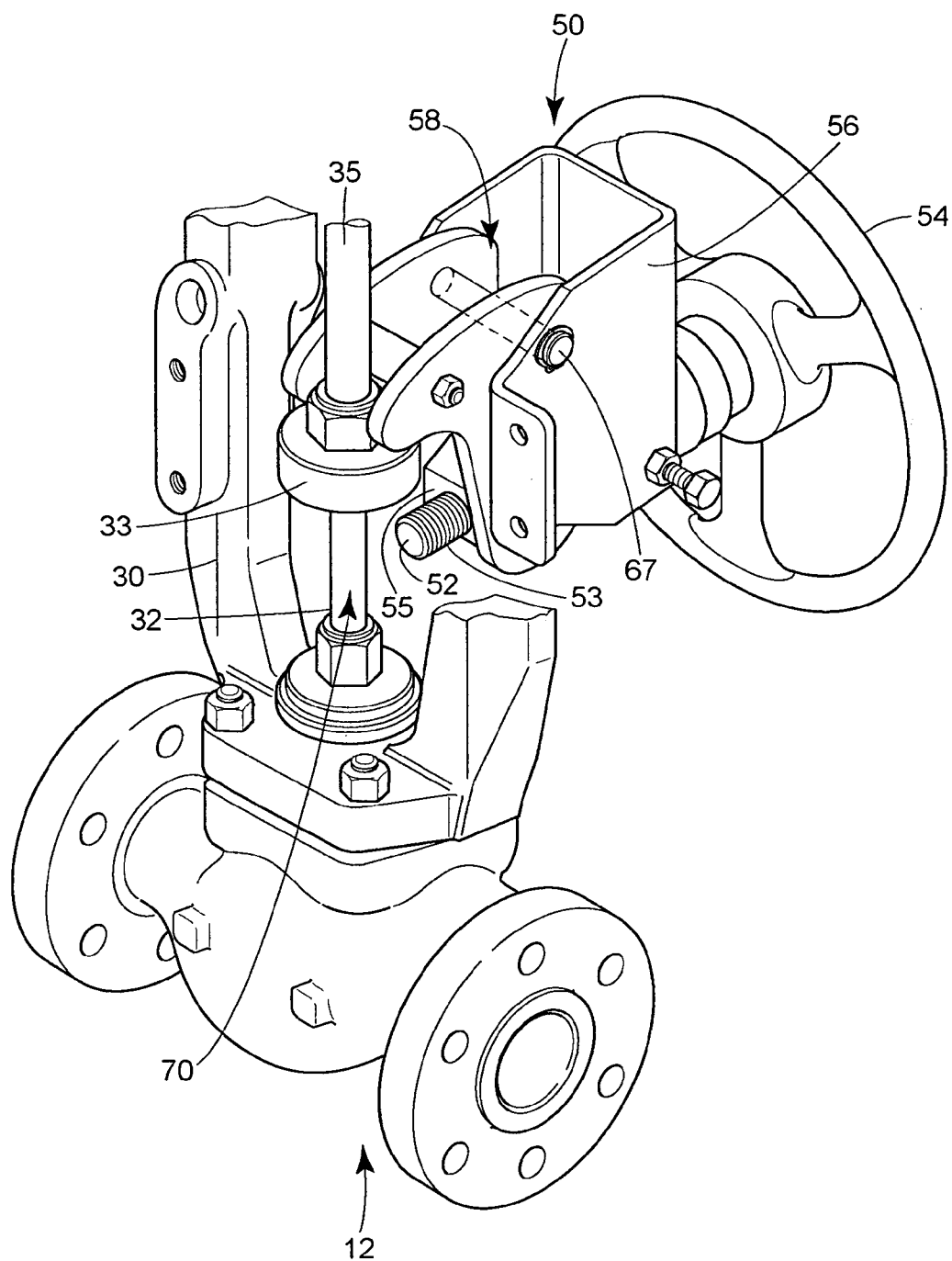
FIG. 3 illustrates another perspective view of the fluid control valve and the manually operated hand jack of FIG. 1 with certain components removed for clarity.

In situations where the valve assembly 10 malfunctions, such as when the actuator 40 becomes inoperable, an alternate means of opening or closing the valve 12 may be needed. FIG. 3 illustrates that a manually operated hand jack 50 may be used to raise or lower a valve stem assembly 70 so that the valve 12 may be placed in a safe open or closed position. As used herein, the term "valve stem assembly," may include all parts associated with the throttle assembly. In the embodiment of FIG. 3, this may include a valve stem 32, an actuator rod 35, and a stem connector 33 for coupling the valve stem 32 to the actuator rod 35.

The manually operated hand jack 50 may include a bracket 56 for supporting and coupling the hand jack 50 to the valve stem assembly 70. In the exemplary embodiment, the bracket 56 is generally U-shaped and includes a proximal end having flanges for attaching to the valve assembly 10. An opposite distal end of the bracket 56 is disposed away from the valve assembly 10 and is adjacent the hand wheel 54. The bracket 56 may be attached to the valve assembly 10 by a number of different fastening methods, including adhesive, welding, riveting, clamping, bolting, screwing, or the like. In the illustrated embodiment of FIG. 1, the bracket 56 is attached to the yoke 30 by mounting bolts 51.

As illustrated in FIG. 3, the hand jack 50 may include a movable lever assembly 58 coupled to the bracket 56 and engaging the valve stem assembly 70, and a connecting rod 52 for moving the lever assembly 58 using a hand wheel 54. As illustrated in FIGS. 1-3, the connecting rod 52 may be journally supported by and may extend through the bracket 56, and may have external threads 53 at one end. A threaded nut 55 may be rotatably mounted to an end of the lever assembly 58 and includes internal threads complementary to the external threads 53. The nut 55, thereby, threadably couples the rod 52 to the lever assembly 58. The threaded nut 55 may take the form of a number of different structures having a threaded internal passage for receiving the threaded rod 52 and a fitting either integrally provided with, or coupled to the structure, for rotatable mounting to the lever assembly 58.

The handwheel 54 facilitates application of a manual torsion force to the connecting rod 52. Alternative mechanisms such as differently shaped levers, an additional automated actuator, a belt and pulley system, or the like, that can generate the requisite rotational force, may be used instead of the illustrated handwheel.

Figure 4:
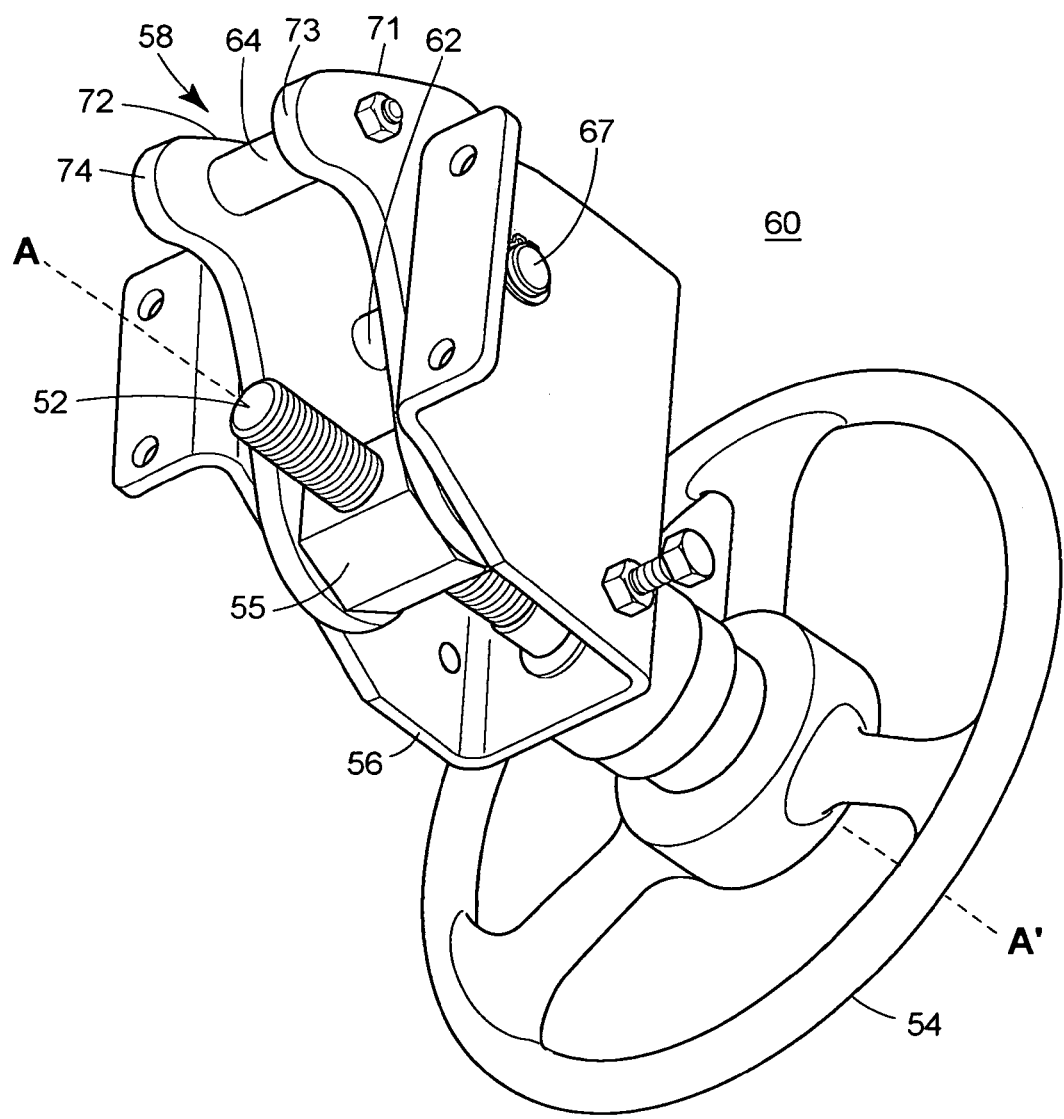
FIG. 4 illustrates an enlarged, bottom view of the manually operated hand jack.

FIG. 4 illustrates an enlarged view of the hand jack assembly 60. The lever assembly 58 may consist of two plates 71, 72 connected by spacers 62, 64 and nut 55. The two plates 71, 72 may form a pair of spaced apart extension arms 73, 74. Such a lever assembly 58 may have a first end that may engage the valve stem assembly 70 by contacting a component of the valve stem assembly 70 having a greater dimension than the length between the spaced apart lever assembly arms 73, 74, such as the stem connector 33 (see FIG. 3). Alternatively, the lever assembly 58 may engage the valve stem assembly 70 in a number of different ways, such as by using fastening devices, pins, bearings, fixtures, or simply pressing against the valve stem assembly when applying a force thereon. A second end of the lever assembly 58 may carry the threaded nut 55.

Operation of the Hand Valve

In operation, the valve works generally as follows. Referring to FIG. 4, rotation of the handwheel 54 rotates the connecting rod 52 and causes the nut 55 to travel along the axis of the connecting rod A-A'. Rotation of the handwheel 54 in the clockwise direction moves the nut 55 along the axis A-A' of the connecting rod 52 in a first axial direction, while a counter-clockwise rotation of the handwheel 54 moves the nut 55 in a second, opposite axial direction along the axis A-A'. The lever assembly 58 is pivotally mounted to the bracket 56 by an axle such as pivot pin 67.

The movement of the nut 55 along the axis A-A' of the connecting rod 52 pivots the lever assembly 58 about the pivot pin 67. Specifically, the lever assembly rotates in a first rotational direction when the nut 55 moves in the first axial direction, and in a second rotational direction opposite the first rotational direction when the nut 55 moves in the second axial direction. As illustrated in FIG. 3, a rotational movement of the lever assembly may cause the extended arms 73, 74 of the lever assembly 58 to contact a valve stem connector 33 and lower the valve stem assembly 70. While the vertical action of the valve stem assembly 70 closes the valve 12 in the illustrated embodiment, the valve 12 may be oriented such that lowering of the valve stem assembly 70 will open the valve. Furthermore, the orientation of the lever assembly 58 may be inverted so that it engages and lifts the valve stem assembly 70, which may either open or close the valve 12 depending on its configuration.

FIG. 4 illustrates more clearly that at the same time that the threaded nut 55 moves along the axis A-A' of the connecting rod, a force orthogonal to the axis of the connecting rod A-A' is applied to the connecting rod 52 where the threaded nut 55 connects to the rod 52. This force moves the threaded nut 55 along an arcuate path defined by a radius between the pin 67 and the threaded nut 55, where the axis of the pin 67 is the center point. The movement of the nut 55 through the arcuate path forces the axis of the connecting rod 52 to be angularly displaced. This angular displacement, or attitude of the rod 52, may be resisted by the connection of the rod 52 to the bracket 56 because the connecting rod 52 is fixed about its connection to the bracket 56. The increased orthogonal force placed on the connecting rod 52 at the connection of the connecting rod 52 with the threaded nut 55 increases the friction between the nut 55 and rod 52, thereby making it more difficult to turn the handwheel 54. The orthogonal force in combination with the resistive force from the bracket coupling creates a bending stress on the connecting rod 52 which can eventually deform the rod 52. Moreover, the orthogonal force is transmitted through the connecting rod 52 and bracket 56 and magnifies the load on the bolts 51 securing the hand jack 50 to the valve assembly.

Figure 5:
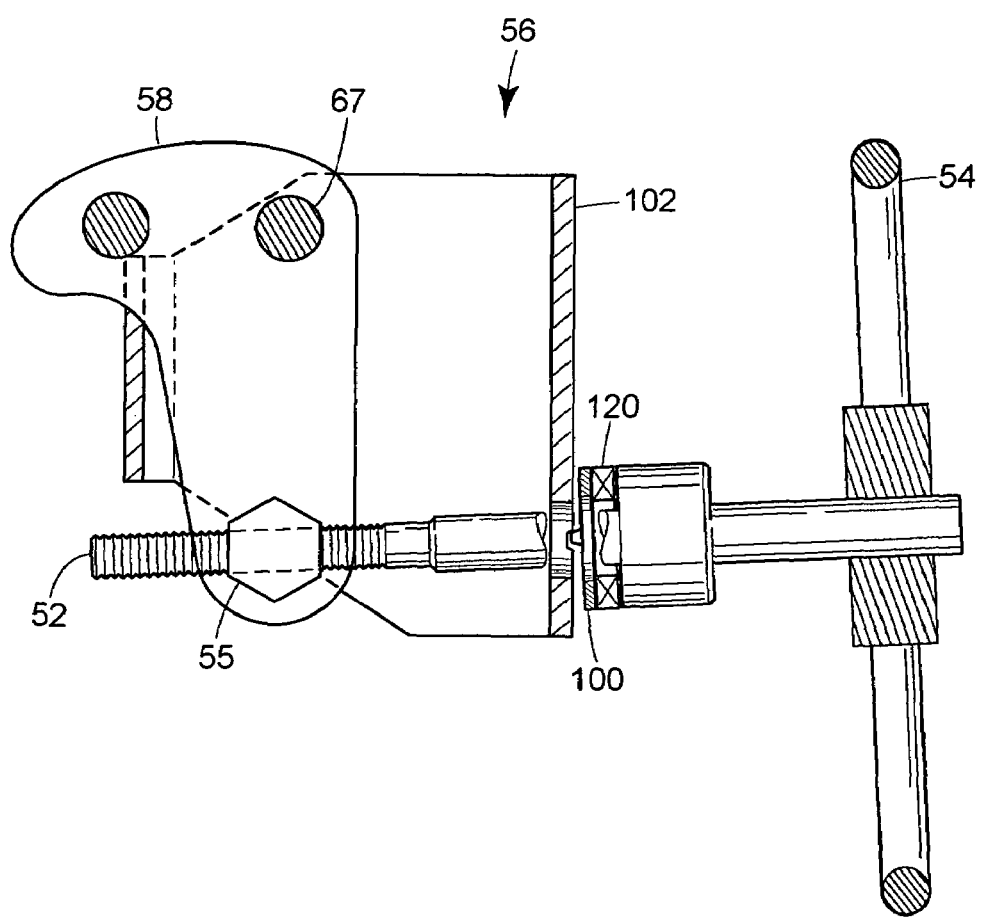
FIG. 5 illustrates a side view, in cross section, of the manually operated hand jack in combination with a pivot washer and thrust bearing according to one embodiment.
Figure 6:
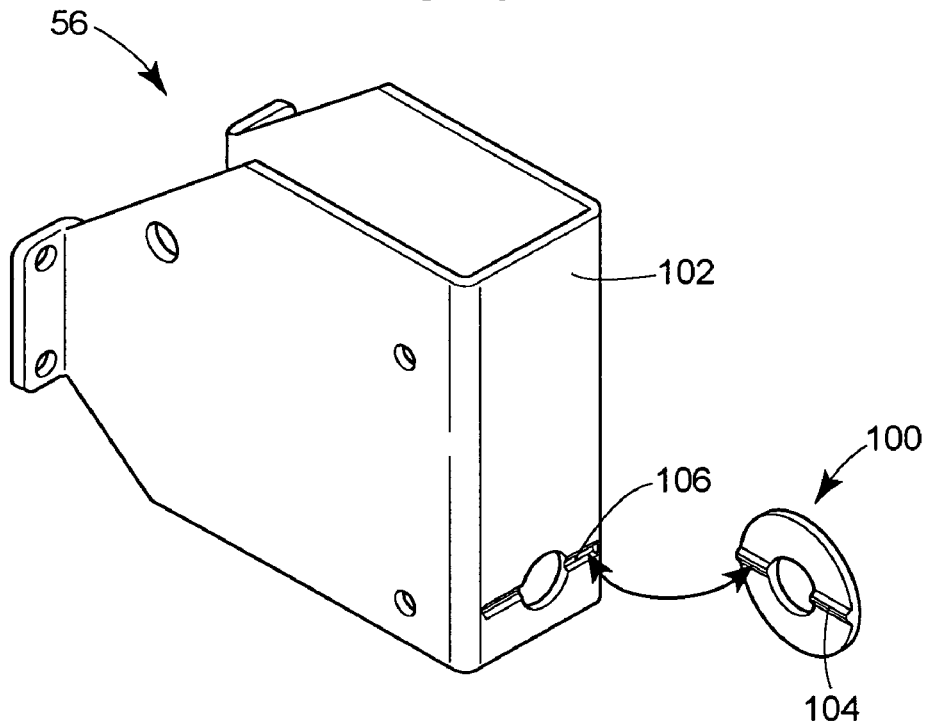
FIG. 6 illustrates a perspective view of a pivot washer and an exterior surface of a bracket used in the manually operated hand jack according to one embodiment.

FIGS. 5-6 illustrate a manually operated hand jack having a pivot washer 100 according to an embodiment of the claims. According to this embodiment of the claims, the pivot washer 100 is disposed between the handwheel 54 and an exterior surface 102 of the bracket 56. As further illustrated in FIG. 6, the pivot washer 100 may have a ridged, or raised, surface 104 on one side that fits into a correspondingly shaped indent 106, or groove, on the exterior surface 102 of the bracket 56. This ridged surface 104 may provide an additional pivot point for the hand jack. The pivot point alleviates the bending stress caused by the orthogonal force on the connecting rod 52 by providing an additional degree of freedom for the connecting rod 52, e.g., the connecting rod 52 can now swing about the pivot point of the pivot washer 100. For example, FIG. 5 illustrates the connecting rod 52 rotated counter-clockwise from horizontal to accommodate movement of the connection point between the connecting rod 52 and nut 55 in a downward arcuate path.

FIG. 5 also illustrates the manually operated hand jack having a pivot washer 100 in combination with a thrust bearing 120 according to an embodiment of the claims. The thrust bearing 120 may be combined with the pivot washer 100 to further reduce the friction and to reduce the required load from the handwheel 54 to operate the valve 12. This reduced rotational load on the shaft also translates into reduced stress applied on the coupling of the bracket 56 to the valve assembly 10. The pivot washer and bearing combination may significantly reduce the required load to operate the valve (such as, for example, from about 65 foot pounds to about 20 foot pounds).

Figure 7:
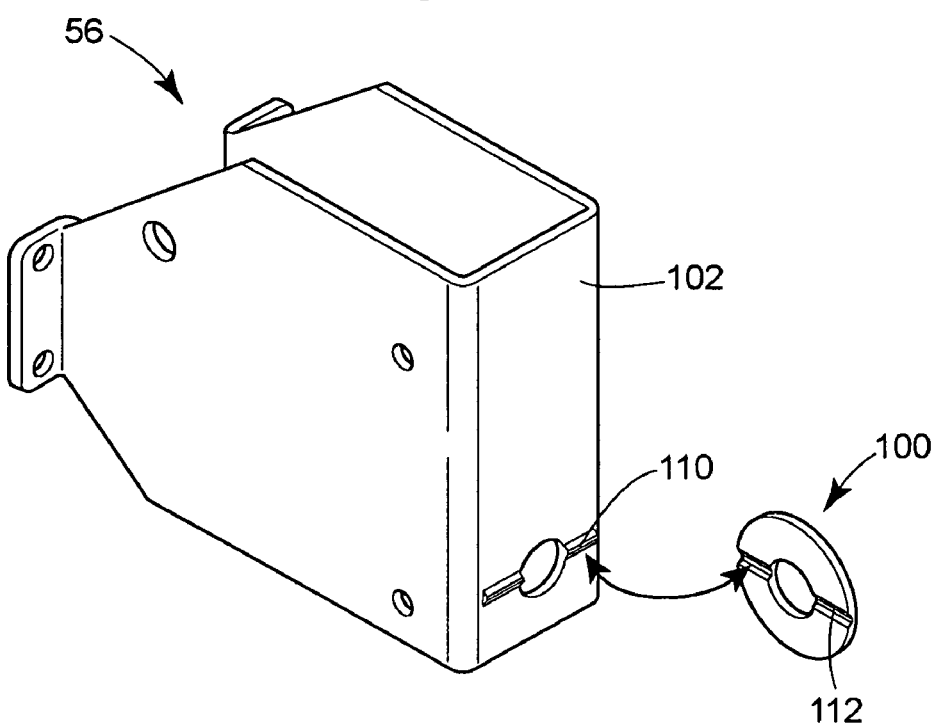
FIG. 7 illustrates an alternate embodiment of the pivot washer and bracket.

FIG. 7 illustrates an alternative embodiment of the hand jack of the claims. FIG. 7 illustrates that a ridged pivot point 110 may be integrally formed on the exterior surface 102 of the bracket 56, instead of on the pivot washer 100. A corresponding indent 112 on the pivot washer may be used to position the washer accordingly. Orientation of the ridged surface may be such that the ridged surface provides an additional degree of freedom for movement of the connecting rod 52 similar to the above described embodiment.

While the exemplary pivot assembly embodiments disclosed herein include complementary ridges and indents, it will be appreciated that other structures may be provided without departing from the scope of this disclosure.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A hand jack for manually actuating a valve stem of a valve assembly, the hand jack comprising:
   a bracket including an aperture and an exterior surface;
   a pivot axle supported by the bracket;
   a lever coupled to the bracket by the pivot axle;
   the lever including a first portion arranged to operatively engage the valve stem;
   the lever including a second portion having a threaded nut, the threaded nut rotatable relative to the lever;
   a rod having an axis and extending through the aperture in the bracket and having threads engaging the threaded nut;
   a pivot washer positioned along the rod to bear against the bracket;
   a thrust bearing carried by the rod and positioned on the rod to apply thrust toward the pivot washer;
   a ridge sized to engage an indent, the ridge and indent carried by cooperating portions of the pivot washer and the exterior surface of the bracket and defining a pivot axis extending across the aperture in the bracket and transverse relative to the axis of the rod.

2. The hand jack of claim 1, wherein the ridge is formed on the exterior surface of the bracket.

3. The hand jack of claim 2, wherein the indent is formed on the pivot washer.

4. The hand jack of claim 1, wherein the ridge is formed on the pivot washer, and wherein the indent is formed on the exterior surface of the bracket.

5. The hand jack of claim 1, wherein the lever comprises first and second lever plates coupled to at least one spacer and the threaded nut is rotatably coupled to the first and second lever plates for rotation about an axis orthogonal to the rod.

6. The hand jack of claim 1, further comprising a handwheel attached to an end of the rod.

7. The hand jack of claim 1, wherein the rod includes a handwheel, and wherein the rod extends sequentially through the thrust bearing, the pivot washer, the aperture on the bracket, and the threaded nut.

8. A side mounted hand jack for manually actuating a valve stem of a valve assembly, the hand jack comprising:
   a u-shaped bracket having flanges, the flanges adapted to couple the bracket to the valve assembly;
   an axle supported by the bracket and perpendicular to the valve stem;
   a lever disposed within an interior of the bracket, the lever secured to the bracket by and pivotable about the axle, wherein a first end of the lever is adapted to engage the valve stem;
   a threaded nut coupled to the lever at a second end of the lever opposite the first end;
   a pivot washer;
   a connecting rod extending sequentially through the threaded nut, through the bracket, and through the pivot washer, wherein the threaded nut is disposed on the connecting rod between the valve stem and the bracket,
   wherein the pivot washer is pivotable about a ridged surface forming a pivot axis disposed adjacent an exterior surface of the bracket.

9. The hand jack of claim 8, further comprising a thrust washer attached to the connecting rod and contacting an interior surface of the bracket and a snap ring for holding the thrust washer on the connecting rod and against the interior surface of the bracket.

10. The hand jack of claim 8, wherein the lever assembly comprises two lever plates coupled by at least one spacer.

11. The hand jack of claim 8, wherein a pivot plane of the connecting rod is parallel to a pivot plane of the lever.

12. The hand jack of claim 8, wherein the threaded nut is rotatably connected to the lever assembly.

13. A fluid control valve assembly comprising:
   a valve body having a fluid inlet, a fluid outlet, a passageway communicating between the fluid inlet and the fluid outlet, and a valve seat in said passageway;
   a throttling element disposed in the passageway and movable relative to the valve seat to control fluid flow through the valve;
   a valve bonnet mounted to the valve body and having a central bore;
   a valve stem coupled to the throttling element and extending through said valve bonnet central bore;
   a yoke coupled to the valve bonnet;
   an actuator coupled to the yoke and having an actuator rod;
   a valve stem connector for coupling the valve stem to the actuator rod, wherein the valve stem, actuator rod and valve stem connector form a valve stem assembly, and wherein the valve body, bonnet, yoke and actuator form a valve assembly;
   a hand jack adapted to engage and manually operate the valve stem assembly, the hand jack comprising:
   a bracket
   an axle supported by the bracket and perpendicular to the valve stem;
   a lever secured to the bracket by and pivotable about the axle, wherein the lever is coupled to the valve stem assembly at a first end of the lever;

a threaded nut coupled to the lever at a second end of the lever opposite the first end from the axle;

a pivot assembly, the pivot assembly comprising a ridged surface formed on a surface of the bracket;

a connecting rod extending sequentially through the threaded nut, through the bracket, and through the pivot washer, the threaded nut disposed on the connecting rod between the valve stem and the bracket, the connecting rod pivotable about the pivot assembly; and wherein the pivot assembly comprises a pivot washer having an indentation corresponding to the ridged surface so that the ridged surface mates with the indentation.

14. The fluid control valve assembly of claim 13, further comprising a thrust bearing disposed adjacent the pivot assembly on a side of the pivot assembly opposite the bracket.

15. The fluid control valve assembly of claim 13, wherein the threaded nut is rotatably coupled to the lever assembly.

16. The fluid control valve assembly of claim 15, wherein the lever comprises first and second lever plates coupled to at least one spacer and the threaded nut is rotatably coupled to the first and second lever plates for rotation about an axis orthogonal to a length of the connecting rod.

17. A fluid control valve assembly comprising:

a valve body having a fluid inlet, a fluid outlet, a passageway communicating between the fluid inlet and the fluid outlet, and a valve seat in said passageway;

a throttling element disposed in the passageway and movable relative to the valve seat to control fluid flow through the valve;

a valve bonnet mounted to the valve body and having a central bore;

a valve stem coupled to the throttling element and extending through said valve bonnet central bore;

a yoke coupled to the valve bonnet;

an actuator coupled to the yoke and having an actuator rod;

a valve stem connector for coupling the valve stem to the actuator rod, wherein the valve stem, actuator rod and valve stem connector form a valve stem assembly, and wherein the valve body, bonnet, yoke and actuator form a valve assembly;

a hand jack adapted to engage and manually operate the valve stem assembly, the hand jack comprising:

a bracket;

an axle supported by the bracket and perpendicular to the valve stem;

a lever secured to the bracket by and pivotable about the axle, wherein the lever is coupled to the valve stem assembly at a first end of the lever;

a threaded nut coupled to the lever at a second end of the lever opposite the first end from the axle;

a pivot assembly;

a connecting rod extending sequentially through the threaded nut, through the bracket, and through the pivot washer, wherein the threaded nut is disposed on the connecting rod between the valve stem and the bracket, the connecting rod is pivotable about the pivot assembly; and wherein the pivot assembly comprises a pivot washer having a ridged surface, and wherein a surface of the bracket comprises an indentation corresponding to the ridged surface.

* * * * *

UNITED STATES PATENT AND TRADEMARK OFFICE
CERTIFICATE OF CORRECTION

| | |
|---|---|
| PATENT NO. | : 7,410,144 B2 |
| APPLICATION NO. | : 11/144122 |
| DATED | : August 12, 2008 |
| INVENTOR(S) | : Douglas P. Gethmann et al. |

It is certified that error appears in the above-identified patent and that said Letters Patent is hereby corrected as shown below:

At Column 6, lines 26-28, "is pivotable about a ridged surface forming a pivot axis disposed adjacent an exterior surface of the bracket" should be -- includes an indentation and is pivotable about a ridged surface formed on an exterior surface of the bracket corresponding to the indentation and forming a pivot axis disposed adjacent an exterior surface of the bracket --.

At Column 6, line 62, "bracket" should be -- bracket; --.

Signed and Sealed this

Eighth Day of September, 2009

David J. Kappos
*Director of the United States Patent and Trademark Office*